United States Patent
Lee et al.

(10) Patent No.: US 12,337,857 B2
(45) Date of Patent: Jun. 24, 2025

(54) SYSTEMS AND METHODS FOR TESTING ACTIVE ROLL CONTROL SYSTEMS IN MOVING VEHICLES

(71) Applicant: GM GLOBAL TECHNOLOGY OPERATIONS LLC, Detroit, MI (US)

(72) Inventors: Kyoungtaek Lee, White Lake, MI (US); Gerald Geck, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 250 days.

(21) Appl. No.: 18/115,040

(22) Filed: Feb. 28, 2023

(65) Prior Publication Data
US 2024/0286625 A1    Aug. 29, 2024

(51) Int. Cl.
*B60W 50/04* (2006.01)
*B60W 50/02* (2012.01)

(52) U.S. Cl.
CPC ........ *B60W 50/04* (2013.01); *B60W 50/0205* (2013.01); *B60W 2050/041* (2013.01); *B60W 2520/40* (2013.01); *B60W 2540/18* (2013.01)

(58) Field of Classification Search
CPC ............. B60W 50/04; B60W 50/0205; B60W 2050/041; B60W 2520/40; B60W 2540/18; B60G 2800/0122; B60G 17/0162; G01M 17/06; G01M 17/007; G05B 23/0213
See application file for complete search history.

(56) References Cited

U.S. PATENT DOCUMENTS

| | | | |
|---|---|---|---|
| 10,388,088 B2* | 8/2019 | Park | B60W 10/06 |
| 2011/0131025 A1* | 6/2011 | Corghi | G01M 17/013 |
| | | | 703/8 |
| 2013/0079988 A1* | 3/2013 | Hirao | B60W 10/184 |
| | | | 701/38 |
| 2015/0224845 A1* | 8/2015 | Anderson | F03G 7/08 |
| | | | 701/37 |
| 2017/0176293 A1* | 6/2017 | Engstrom | G01M 17/007 |
| 2017/0191902 A1* | 7/2017 | Komada | G01M 17/0074 |
| 2017/0210191 A1* | 7/2017 | Saeger | B60G 11/27 |
| 2017/0336289 A1* | 11/2017 | Pfister | G01M 17/0072 |
| 2018/0328818 A1* | 11/2018 | Smith | G01M 17/022 |
| 2019/0318051 A1* | 10/2019 | Oswald | G06F 30/20 |
| 2020/0363277 A1* | 11/2020 | Engström | G01M 17/007 |
| 2021/0009200 A1* | 1/2021 | Zegelaar | B62D 15/0265 |
| 2021/0221434 A1* | 7/2021 | Liu | B60W 60/0015 |
| 2022/0388485 A1* | 12/2022 | Hirao | B60G 17/08 |
| 2023/0003618 A1* | 1/2023 | Breton | G01M 17/007 |

(Continued)

*Primary Examiner* — Abdalla A Khaled

(57) ABSTRACT

A system for conducting a test of an active roll control (ARC) system in a vehicle while the vehicle is moving includes a module and a control module. The module is configured to receive a maneuver and an expected torque associated with the ARC system for the maneuver according to a defined velocity and a defined steering angle. The control module is configured to receive, while the vehicle is controlled to execute the maneuver, an actual torque of the ARC system, an actual velocity of the vehicle, and an actual steering angle of the vehicle. The module is configured to determine whether any one of the actual torque, the actual velocity, and the actual steering angle falls below the expected torque, the defined velocity, and the defined steering angle, respectively, and in response, generate a signal indicating a failure of the test. Other examples systems and methods are also disclosed.

20 Claims, 5 Drawing Sheets

(56) References Cited

U.S. PATENT DOCUMENTS

| | | | |
|---|---|---|---|
| 2023/0013377 A1* | 1/2023 | Horiguchi | B60W 50/10 |
| 2023/0077116 A1* | 3/2023 | Oh | B60W 40/107 |
| 2023/0096428 A1* | 3/2023 | Conlin | G01M 17/0072 |
| | | | 73/125 |
| 2023/0137834 A1* | 5/2023 | Oh | B60W 30/18172 |
| | | | 701/69 |
| 2023/0174143 A1* | 6/2023 | Ghoneim | B62D 5/0463 |
| | | | 180/443 |
| 2024/0182108 A1* | 6/2024 | Zhou | B60W 10/04 |

* cited by examiner

SYSTEMS AND METHODS FOR TESTING ACTIVE ROLL CONTROL SYSTEMS IN MOVING VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for testing active roll control systems, and more particularly to procedures for testing active roll control systems in moving vehicles.

A vehicle includes a suspension system having stabilizer bars in the front and rear of the vehicle. Each stabilizer bar generates torque to counteract a tilting or roll effect of the vehicle chassis and to maintain stability of the vehicle and/or prevent roll over when the vehicle is turning. The stabilizer bars may function mechanically such that torque is naturally generated through twisting of the bars when the vehicle is turning. Alternatively, the stabilizer bars may function electromechanically such that the amount of torque is actively controlled when the vehicle is turning. Such arrangements are referred to as active roll control systems.

SUMMARY

An on-board diagnostics (OBD) system for conducting a test of at least one active roll control (ARC) system in a vehicle while the vehicle is moving is disclosed. The OBD system includes a module and at least one control module in communication with the ARC system of the vehicle and the module. The module is configured to receive a selected maneuver of a plurality of maneuvers for the vehicle, and receive an expected torque associated with the ARC system for the selected maneuver according to a defined velocity and a defined steering angle of the vehicle. The module includes an OBD module or a user device module. The control module is configured to receive, while the vehicle is controlled to execute the selected maneuver, an actual torque of the ARC system, an actual velocity of the vehicle, and an actual steering angle of the vehicle. The module is configured to determine whether any one of the actual torque, the actual velocity, and the actual steering angle falls below the expected torque, the defined velocity, and the defined steering angle, respectively, and in response to determining any one of the actual torque, the actual velocity, and the actual steering angle falls below the expected torque, the defined velocity, and the defined steering angle, generate a signal indicating a failure of the test.

In other features, the module is configured to generate a signal indicating a success of the test in response to determining each of the actual torque, the actual velocity, and the actual steering angle is greater than or equal to the expected torque, the defined velocity, and the defined steering angle, respectively.

In other features, the module is configured to receive a defined sign convention of the expected torque for the selected maneuver, determine whether a sign convention of the actual torque matches the defined sign convention, and in response to determining that the sign convention of the actual torque does not match the defined sign convention, generate the signal indicating the failure of the test.

In other features, the module is configured to identify whether a diagnostics trouble code associated with the ARC system exists prior to receiving the selected maneuver, and in response to identifying the diagnostics trouble code, generate the signal indicating the failure of the test.

In other features, the module is configured to identify each of the actual torque, the actual velocity, and the actual steering angle that falls below the expected torque, the defined velocity, and the defined steering angle, respectively, and generate the signal indicating the failure of the test and an explanation of the failure specific to each of the actual torque, the actual velocity, and the actual steering angle falling below the expected torque, the defined velocity, and the defined steering angle.

In other features, the module is configured to display a message indicating the failure of the test and/or the explanation, and/or display the plurality of maneuvers.

In other features, the plurality of maneuvers for the vehicle includes a U-turn maneuver, a left turn maneuver, and a right turn maneuver.

In other features, the OBD system includes a memory circuit in communication with the module. The memory circuit is configured to store the expected torque, the defined velocity, and the defined steering angle. The module is configured to receive the expected torque, the defined velocity, and the defined steering angle from the memory circuit.

In other features, a vehicle includes the OBD system and at least one ARC system in communication with the OBD system.

An OBD method for testing at least one active roll control (ARC) system in a vehicle while the vehicle is moving is disclosed. The OBD method includes receiving, for a test of the ARC system, a selected maneuver of a plurality of maneuvers for the vehicle, receiving an expected torque of the ARC system for the selected maneuver according to a defined velocity and a defined steering angle of the vehicle, receiving, while the vehicle is controlled to execute the selected maneuver, an actual torque of the ARC system, an actual velocity of the vehicle, and an actual steering angle of the vehicle, determining whether any one of the actual torque, the actual velocity, and the actual steering angle falls below the expected torque, the defined velocity, and the defined steering angle, respectively, and in response to determining any one of the actual torque, the actual velocity, and the actual steering angle falls below the expected torque, the defined velocity, and the defined steering angle, generating a signal indicating a failure of the test.

In other features, the OBD method includes generating a signal indicating a success of the test in response to determining each of the actual torque, the actual velocity, and the actual steering angle is greater than or equal to the expected torque, the defined velocity, and the defined steering angle, respectively.

In other features, the OBD method includes receiving a defined sign convention of the expected torque for the selected maneuver, determining whether a sign convention of the actual torque matches the defined sign convention, and in response to determining that the sign convention of the actual torque does not match the defined sign convention, generating the signal indicating the failure of the test.

In other features, the OBD method includes identifying whether a diagnostics trouble code associated with the ARC system exists prior to receiving the selected maneuver, and in response to identifying the diagnostics trouble code, generating the signal indicating the failure of the test.

In other features, the OBD method includes identifying each of the actual torque, the actual velocity, and the actual steering angle that falls below the expected torque, the defined velocity, and the defined steering angle, respectively, and generating the signal indicating the failure of the test and an explanation of the failure specific to each of the actual torque, the actual velocity, and the actual steering angle falling below the expected torque, the defined velocity, and the defined steering angle.

In other features, the OBD method includes displaying a message indicating the failure and/or the explanation.

In other features, the plurality of maneuvers for the vehicle includes a U-turn maneuver, a left turn maneuver, and a right turn maneuver, and/or the expected torque, the defined velocity, and the defined steering angle are stored in a memory circuit.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes one or more active roll control (ARC) systems that actively control an amount of torque of a stabilizer bar to counteract a tilting or roll effect of the vehicle chassis and to maintain stability of the vehicle and/or prevent roll over when the vehicle is turning. Typically, the vehicle includes two stabilizer bars, one in the front of the vehicle and one in the rear of the vehicle. In such examples, each stabilizer bar may be actively controlled. The ARC systems may be tested to ensure the ARC systems are functioning properly. However, such tests are inadequate, require multiple technicians, and require a stationary vehicle (e.g., a static test).

Testing procedures according to the present disclosure provide accurate testing of ARC systems in a vehicle while the vehicle is moving. For example, the vehicle may include an on-board diagnostics (OBD) system that conducts testing of the ARC systems while the vehicle is controlled by a user (e.g., a driver, etc.) to execute a prescribed maneuver. In such examples, an expected torque associated with the ARC systems for the prescribed maneuver may be known or determined according to a defined velocity and a defined steering angle of the vehicle. The OBD system receives a generated torque of the ARC systems, and a velocity (e.g., a speed) and a steering angle of the vehicle executing the prescribed maneuver, and then determines whether the actual generated torque, velocity, and steering angle of the vehicle fall below or meets the expected torque, the defined velocity, and the defined steering angle. Based on this determination, the OBD system may provide a pass or fail result of the test. In this manner, testing of the ARC systems may be conducted as the vehicle is moving (e.g., actually executing a prescribed maneuver) and by one technician to allow the technician to focus on driving the vehicle. As such, testing of the ARC systems described herein may reduce service labor time/costs and ensure safe conditions by utilizing one technician, and obtain accurate results by conducting the testing while the vehicle is moving.

Figure 1:
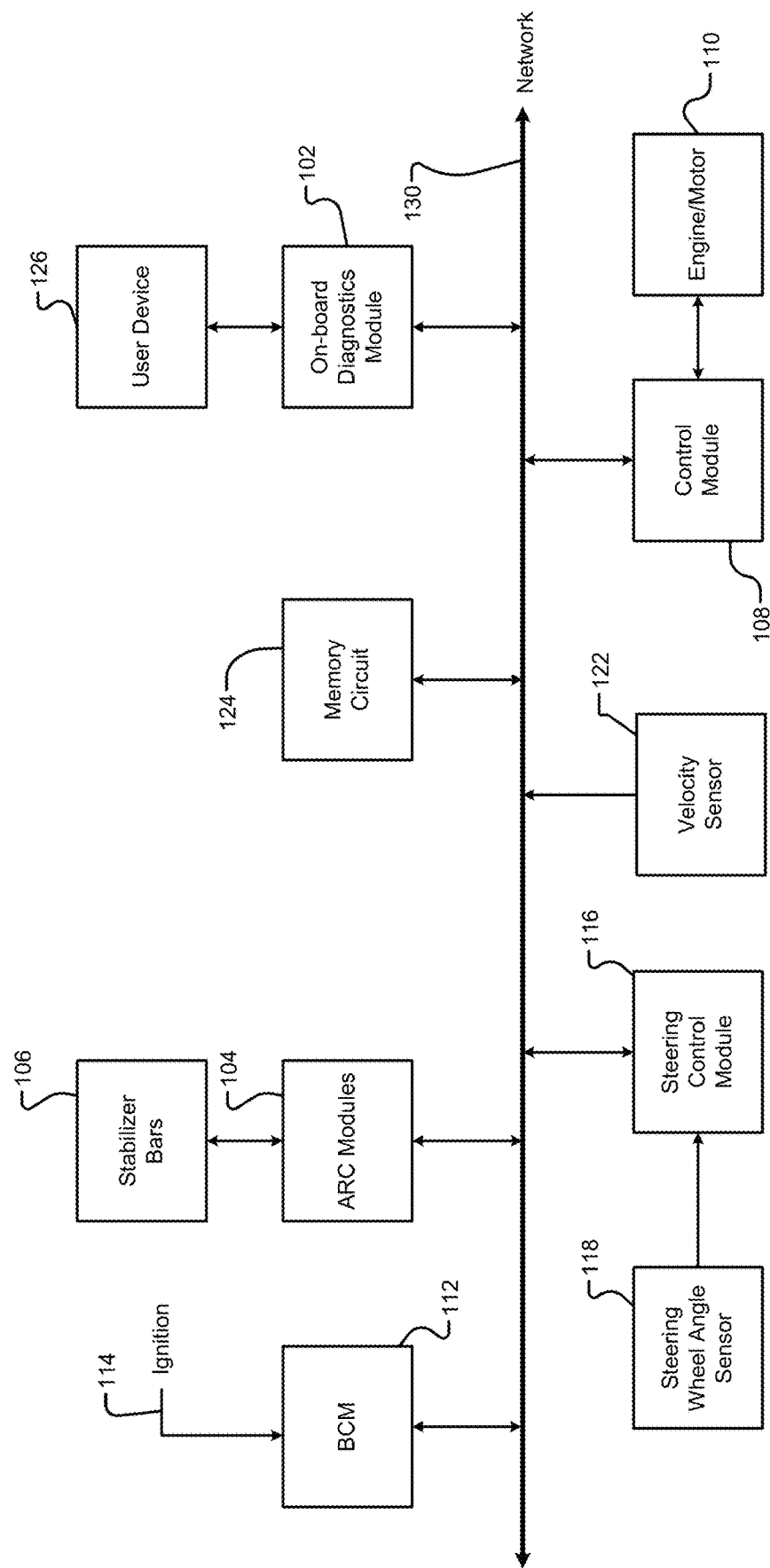
FIG. 1 is a functional block diagram of an example vehicle system including on-board diagnostics system for testing active roll control systems according to the present disclosure.

Referring now to FIG. 1, a functional block diagram of an example vehicle system is presented. The vehicle system may be for any suitable vehicle having an ARC system, such as an electric vehicle (e.g., a pure electric vehicle, a plug-in hybrid electric vehicle, etc.), an internal combustion engine vehicle, etc. Additionally, the vehicle system may be applicable to an autonomous vehicle, a semi-autonomous vehicle, or a non-autonomous vehicle.

As shown in FIG. 1, the vehicle system generally includes an OBD module 102, ARC systems each having an ARC module 104 and a stabilizer bar 106, a control module (e.g., an engine control module) 108, a body control module (BCM) 112, a steering control module 116, a steering wheel angle sensor 118, and a velocity sensor 122. While the vehicle system is described herein as having an ARC module 104 associated with each stabilizer bar 106, it should be appreciated that one ARC module 104 may be associated with both stabilizer bars 106 if desired.

The above-mentioned modules and sensors of the vehicle system may share parameters via a network 130, such as a controller area network (CAN). A CAN may also be referred to as a car area network. For example, the network 130 may include one or more data buses. Various parameters may be made available by a given module to other modules via the network 130.

The control module 108 controls an engine and/or motor 110. For example, in an internal combustion engine vehicle, the control module 108 may control actuation of engine actuators, such as a throttle valve, one or more spark plugs, one or more fuel injectors, valve actuators, camshaft phasers, an exhaust gas recirculation valve, one or more boost devices, and other suitable engine actuators. In some types of vehicles (e.g., electric vehicles), the engine may be omitted. If the vehicle is an electric vehicle, the control module 108 may control an electric motor. For example, the electric motor may act as either a generator or as a motor at a given time. When acting as a generator, the electric motor converts mechanical energy into electrical energy. The electrical energy can be, for example, used to charge a battery via a power control device. When acting as a motor, the electric motor generates torque that may be used, for example, to supplement or replace torque output by the engine.

The steering control module 116 controls steering/turning of wheels of the vehicle, for example, based on a driver turning a steering wheel within the vehicle and/or steering commands from one or more vehicle control modules. The steering wheel angle (SWA) sensor 118 may monitor rotational position of the steering wheel and generate a SWA signal based on the position of the steering wheel. The generated SWA signal is then provided to the steering control module 116. As an example, the steering control module 116 may control vehicle steering via an electronic power steering (EPS) motor based on the generated SWA signal. However, the vehicle may include another type of steering system. The steering control module 116 and/or the EPS motor may then provide the SWA signal to the control module 108, the OBD module 102, and/or another control module in the vehicle.

The BCM 112 may monitor an ignition state of the vehicle. For example, an ignition state 114 of the vehicle may be provided to the BCM 112, as shown in FIG. 1. In such examples, the ignition state 114 may be input by a driver via an ignition key, button, or switch. At a given time, the ignition state 114 may be one of off, accessory, run, or crank. The BCM 112 may then provide a signal representing the ignition state of the vehicle to the control module 108, the OBD module 102, and/or another control module in the vehicle.

The velocity sensor 122 monitors the speed (e.g., miles per hours, kilometers per hour, etc.) of the vehicle. For example, the velocity sensor 122 may include a vehicle speed sensor (VSS) that measures a transmission/transaxle output or wheel speed. The velocity sensor 122 may then provide a signal representing the velocity of the vehicle to the control module 108, the OBD module 102, and/or another control module in the vehicle. In other examples, the control module 108 may receive a signal representing an accelerator pedal position of the vehicle. In such examples, the control module 108 may determine or calculate the velocity of the vehicle based on the accelerator pedal position.

The ARC modules 104 of the ARC systems actively control an amount of torque of the stabilizer bars 106. For example, one of the stabilizer bars 106 is positioned in the front of the vehicle to work with a front suspension system and another one of the stabilizer bars 106 is positioned in the rear of the vehicle to work with a rear suspension system. In such examples, the ARC modules 104 control how much torque is provided by the stabilizer bars 106 based on, for example, signals from the control module 108 and/or another control module in the vehicle, to counteract a tilting or roll effect of the vehicle chassis and to maintain stability of the vehicle and/or prevent roll over when the vehicle is turning.

In various embodiments, the ARC modules 104 may monitor the actual output torque of the stabilizer bars 106, and then generate one or more torque signals representing the actual torque of the stabilizer bars 106. The torque signals may then be provided to the control module 108, the OBD module 102, and/or another control module in the vehicle. In such examples, the ARC modules 104 may include or be in communication with a torque sensor. In other examples, the control module 108 may determine or calculate the output torque of the stabilizer bars 106 based on, for example, data from a supplier of the ARC modules 104 and/or stabilizer bars 106.

With continued reference to FIG. 1, the vehicle system may further include a memory circuit 124 for storing various parameters associated with the vehicle. More specifically, the memory circuit 124 may store a variety of vehicle maneuvers, expected torque values associated with each vehicle maneuver, defined sign conventions of the expected torque values for each vehicle maneuver, and defined velocity values and steering angle values associated with the expected torque values. For example, each stored torque value may be an expected value according to a corresponding defined velocity value and steering angle value, all of which is stored in the memory circuit 124. In other words, when the vehicle is controlled at or above a particular velocity value and a particular steering angle value (e.g., driver inputs) for one vehicle maneuver, an expected amount of torque is provided by the stabilizer bars 106.

The memory circuit 124 may be in communication with the OBD module 102. For example, the memory circuit 124 may communicate with the OBD module 102 via the network 130 as shown in FIG. 1 and/or via another network. In other embodiments, the OBD module 102 and/or a user device module 126 (further explained below) may include the memory circuit 124 or portions thereof.

The OBD module 102 is in communication with various modules and sensors of the vehicle and various input and output devices for conducting a test of the ARC systems. For example, and as shown in FIG. 1, the OBD module 102 is in communication with the user device module 126. In such examples, the user device module 126 may be an interactive display device of the vehicle and have a user interface to allow users to select an input for the OBD module 102 and view an output from the OBD module 102. In other embodiments, the user device module 126 may be an external device (e.g., a laptop, etc.) in communication with the OBD module 102. While the user device module 126 of FIG. 1 is shown as both an input and an output device, it should be appreciated that the OBD module 102 may be in communication with separate input and output devices.

In various embodiments, the OBD module 102 may cause the user device module 126 to display multiple vehicle maneuvers. Such vehicle maneuvers may include, for example, a U-turn maneuver, a right turn maneuver, a left turn maneuver, etc. In various embodiments, the right turn maneuver may include, for example, any suitable turn in a clockwise direction, such as a constant radius right turn in a circle, a 90-degree right turn, a right turn of less than 90 degrees, a right turn of between 90 degrees and 180 degrees, a right turn of more than 180 degrees etc. Additionally, the left turn maneuver may include, for example, any suitable turn in a counterclockwise direction, such as a constant radius left turn in a circle, a 90-degree left turn, a left turn of less than 90 degrees, a left turn of between 90 degrees and 180 degrees, a left turn of more than 180 degrees etc. A user (e.g., a driver, etc.) may then select one of the vehicle maneuvers. After one of the vehicle maneuvers is selected, the user device module 126 may provide (e.g., transmit, etc.) the selected maneuver to the OBD module 102.

The OBD module 102 may also receive various parameters from the memory circuit 124. For example, the OBD module 102 may receive a stored expected torque value for the selected vehicle maneuver, and corresponding stored velocity and steering angle values of the vehicle to reach the expected torque value. In various embodiments, the OBD module 102 may provide the stored velocity and steering angle values to the user device module 126 for display. In this manner, a user may be made aware of the particular velocity and steering angle (e.g., procedure criteria) necessary for the test of the ARC systems.

Additionally, the OBD module 102 may receive parameters, such as the ignition state 114 of the vehicle, the actual output torque of the stabilizer bars 106, the actual velocity of the vehicle, the actual steering angle of the vehicle, etc. before and/or while the vehicle is controlled by the user to execute the selected maneuver. In such examples, the ignition state 114 of the vehicle, the actual output torque of the stabilizer bars 106, the velocity of the vehicle, and the steering angle of the vehicle may be provided individually from the BCM 112, the control module 108 (or the ARC modules 104), the velocity sensor 122, and the steering control module 116, or collectively from the control module 108.

Then, the OBD module 102 may determine whether the ARC systems pass or fail testing based on the received parameters. For example, the OBD module 102 may determine whether any one of the actual output torque of the stabilizer bars 106, the actual velocity of the moving vehicle, and the actual steering angle of the moving vehicle falls below or meets the expected torque, the defined velocity, and the defined steering angle, respectively. For instance, the OBD module 102 may determine that any one of the actual torque, velocity, and steering angle values falls below or meets the expected torque, the defined velocity, and the defined steering angle values by directly comparing the values of each. In other examples, the OBD module 102 may determine that any one of the actual torque, velocity, and steering angle values falls below or meets the expected torque, the defined velocity, and the defined steering angle values by subtracting the associated values and then comparing the difference to thresholds.

The OBD module 102 may then generate and transmit a signal to the user device module 126 indicating a failure or a success of test. In such examples, the user device module 126 may display a result (e.g., pass or fail) of the test. For example, the OBD module 102 may generate and transmit a signal to the user device module 126 indicating a success of test in response to determining that each of the actual torque, the actual velocity, and the actual steering angle is greater than or equal to the expected torque, the defined velocity, and the defined steering angle, respectively. Alternatively, the OBD module 102 may generate and transmit a signal to the user device module 126 indicating a failure of test in response to determining that any one of the actual torque, the actual velocity, and the actual steering angle falls below the expected torque, the defined velocity, and the defined steering angle, respectively.

In various embodiments, the OBD module 102 may identify each of the actual torque, the actual velocity, and the actual steering angle that falls below the expected torque, the defined velocity, and the defined steering angle, respectively. For example, if the OBD module 102 determines that any of procedure criteria (e.g., the actual velocity and/or the actual steering angle) of the moving vehicle does not meet the defined values (e.g., the defined velocity and/or the defined steering angle), the OBD module 102 may transmit the signal to the user device module 126 indicating the failure of identified procedure criteria. Additionally, if the OBD module 102 determines that performance criteria (e.g., the actual torque) of the moving vehicle does not meet the expected value (e.g., the expected torque), the OBD module 102 may transmit the signal to the user device module 126 indicating the failure of identified performance criteria.

Additionally, the OBD module 102 may provide to the user device module 126 an explanation of the failure specific to the identified procedure criteria (e.g., the actual velocity and/or the actual steering angle) and/or performance criteria (e.g., the actual torque). This may be provided with the failure signal of the test. For example, the OBD module 102 may determine why one or more of the identified procedure criteria and/or performance criteria were not met. In such examples, the user device module 126 may then display a message indicating the velocity and/or the steering angle of the vehicle executing the selected maneuver are/is below the defined velocity and/or the defined steering angle, and/or indicating the actual torque of one or both stabilizer bars 106 is below the expected torque. In this manner, the user is made aware of possible failures in the execution of the selected maneuver and/or in the performance of the ARC systems. The user can then rerun the test to meet the procedure criteria and/or inspect the ARC systems if desired.

In various embodiments, the OBD module 102 may also receive a defined sign convention from the memory circuit 124 of the expected torque of both stabilizer bars 106 for the selected vehicle maneuver. For example, if the selected vehicle maneuver is a left turn maneuver or a U-turn maneuver to the left, the expected sign convention of the actual torque for both stabilizer bars 106 is positive. Conversely, if the selected vehicle maneuver is a right turn maneuver or a U-turn maneuver to the right, the expected sign convention of the actual torque for both stabilizer bars 106 is negative.

Then, the OBD module 102 may determine whether a sign convention of the actual torque of both stabilizer bars 106 matches the defined sign convention for the selected vehicle maneuver. For example, the OBD module 102 may compare the sign convention of the actual torque of both stabilizer bars 106 to the defined sign convention to identify if the sign convention of the actual torque of one or both stabilizer bars 106 is different than the defined sign convention. The OBD module 102 may then generate and transmit the signal to the user device module 126 indicating the failure of the test in response to determining that the sign convention of the actual torque does not match the defined sign convention.

Additionally, in various embodiments, the OBD module 102 may identify whether a diagnostics trouble code (DTC) associated with the ARC system exists (e.g., is set). In some examples, the OBD module 102 may make this identification prior to receiving the selected maneuver from the user device module 126. For example, the OBD module 102 may analyze any DTCs that may be set to identify whether a DTC associated with the ARC system exists. In response to identifying a DTC associated with the ARC system, the OBD module 102 may transmit the signal to the user device module 126 indicating the failure of the test due to the identified DTC.

Although the OBD module 102 is described above as determining whether the ARC systems pass or fail testing based on the received parameters, generating and transmitting signals indicating a failure or a success of the test, etc., it should be appreciated that the user device module 126 may function in a similar manner. For example, the OBD module 102 may serve as a pass-through communication device between the modules, sensors, etc. of FIG. 1 and the user device module 126. In such examples, the user device module 126 may receive the actual parameters (e.g., the actual output torque, the velocity of the vehicle, the steering angle of the vehicle, etc.), determine whether the ARC systems pass or fail testing based on the received parameters, generate a signal indicating a failure or a success of the test, etc. in a similar manner as explained above relative to the OBD module 102.

Figure 2:
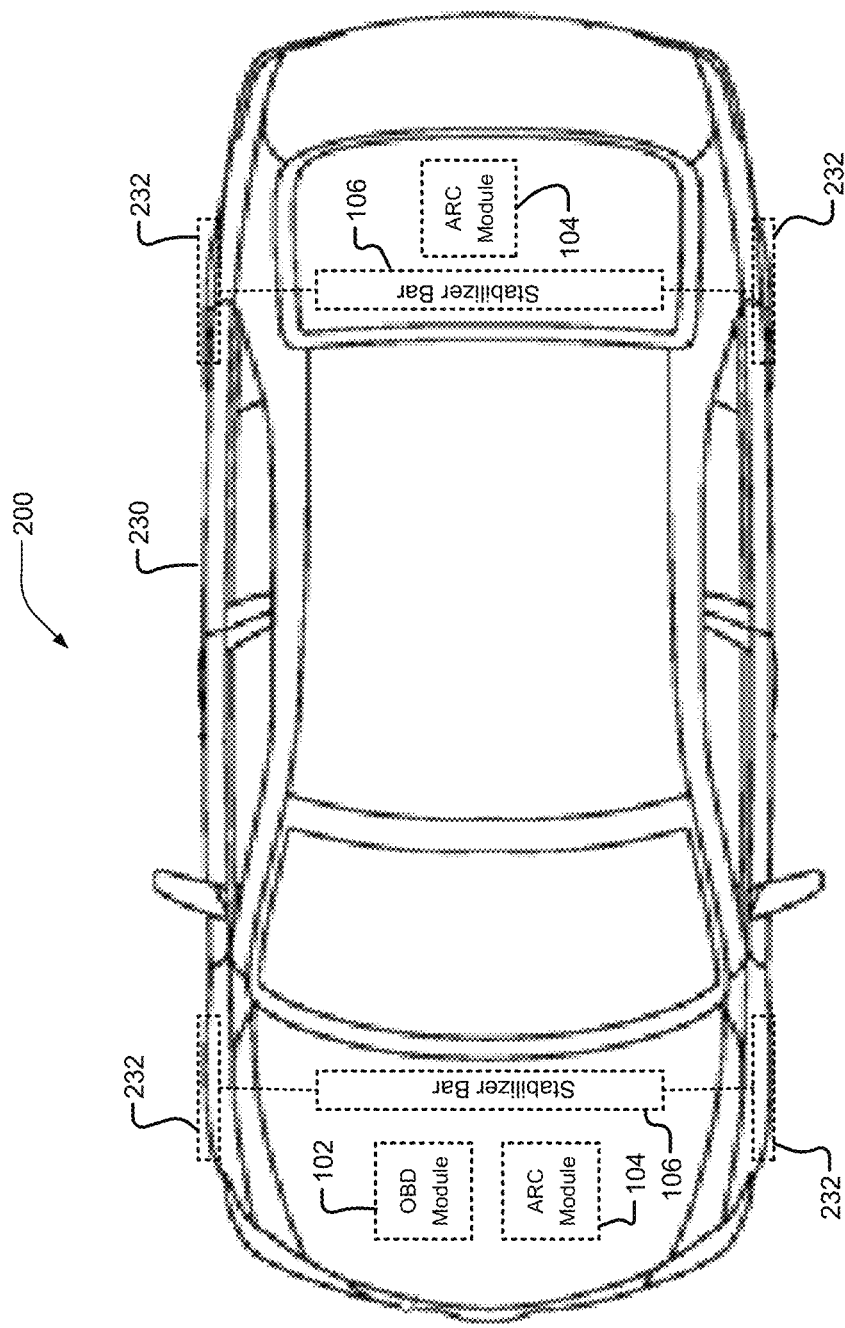
FIG. 2 is a functional block diagram of a vehicle including portions of the on-board diagnostics system of FIG. 1 according to the present disclosure.

In various embodiments, the vehicle system of FIG. 1 may be implemented in any suitable vehicle. For example, FIG. 2 is a top view of the example vehicle 200 including a body 230 arranged on a chassis (not shown), four wheels 232, and a portion of the vehicle system of FIG. 1. More specifically, the vehicle 200 is shown as including the OBD module 102, the ARC modules 104, and the stabilizer bars 106 of FIG. 1. As shown, one of the stabilizer bars 106 is positioned in the front of the vehicle 200 and the other stabilizer bar 106 is positioned in the rear of the vehicle 200.

Although not shown in FIG. 2, the vehicle 200 may also include the other modules and sensors referenced above relative to FIG. 1.

In the embodiment of FIG. 2, the vehicle 200 may be any suitable type of vehicle. For example, the vehicle 200 may be an electric vehicle (e.g., a pure electric vehicle, a plug-in hybrid electric vehicle, etc.), an internal combustion engine vehicle, etc. Additionally, the vehicle 200 may be an autonomous vehicle, a semi-autonomous vehicle, or a non-autonomous vehicle.

Figure 3:
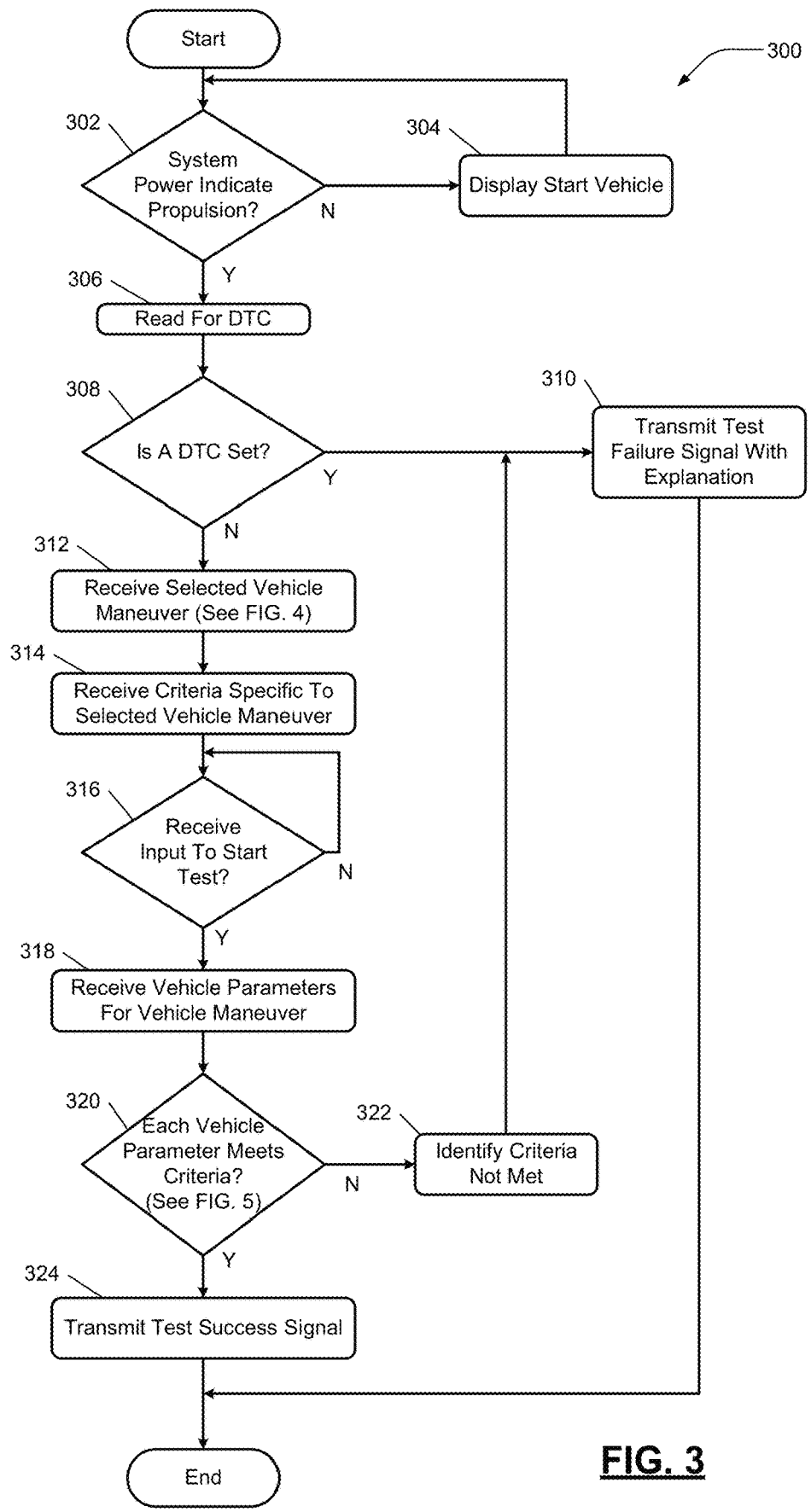
FIG. 3 is a flowchart of a control process for testing one or more ARC systems in a vehicle according to the present disclosure.

FIG. 3 illustrates an example OBD control process 300 employable by the vehicle system of FIG. 1 for testing one or more ARC systems in a vehicle while the vehicle is moving. Although the example OBD control process 300 is described in relation to the vehicle system of FIG. 1, including the OBD module 102, the control module 108 and the user device module 126, the control process 300 may be employable by any suitable vehicle system, OBD module, control module and/or user device. The OBD control process 300 may start when the vehicle system is powered-on and/or at another suitable time. For example, the OBD control process 300 may start after a user selects an input (e.g., on the user device module 126, etc.) to initiate testing.

As shown in FIG. 3, control begins at 302 where the OBD module 102 determines if system power of the vehicle indicates propulsion. For example, the OBD module 102 may receive a signal representing the ignition state of the vehicle from the control module 108, the BCM 112, etc. of FIG. 1. The ignition state may indicate if the vehicle is started (e.g., the system power of the vehicle indicates propulsion). If so, control proceeds to 306. Otherwise, control proceeds to 304 where the OBD module 102 transmits a signal to the user device module 126 to display a message to the user to start the vehicle. Control then returns to 302.

At 306, the OBD module 102 reads for any DTCs that may be set. The OBD module 102 then determines at 308 if any DTC associated with the ARC systems is set, as explained herein. If no, control proceeds to 312. Otherwise, control proceeds to 310 where the OBD module 102 transmits a test failure signal to the user device module 126 indicating a failure of the test due to the set DTC. In various embodiments, the user device module 126 may display a message indicating a failure of the test due to the set DTC. For example, the displayed message may be "Test fail due to incorrect DTC set with ARC." In response, a technician (e.g., the user, etc.) may review data, rerun the test, inspect hardware (e.g., the ARC control modules 104, the stabilizer bars 106, etc.), etc. Control then may end.

Figure 4:
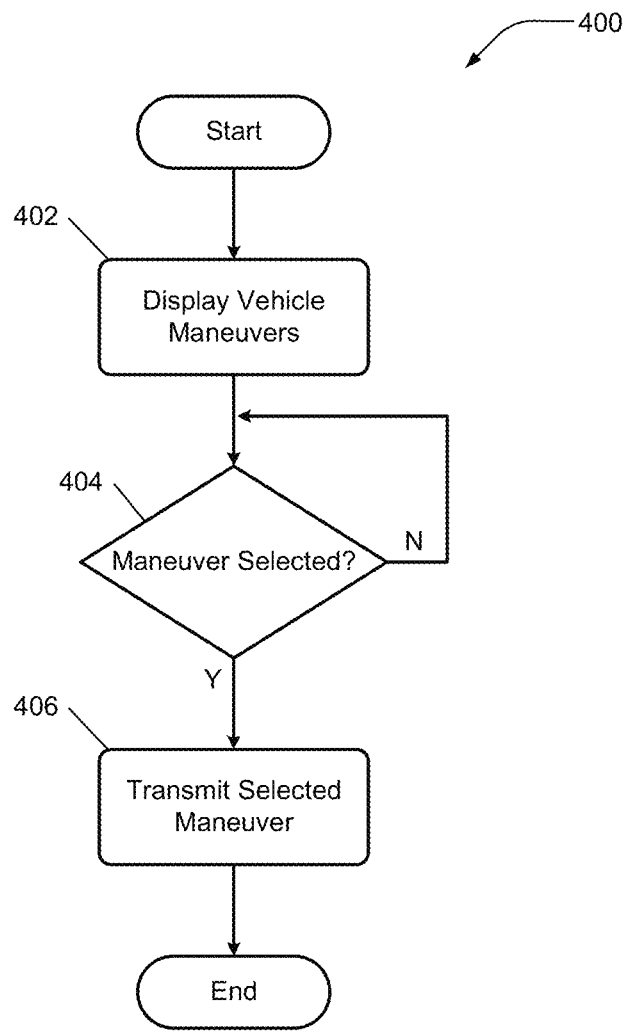
FIG. 4 is a flowchart of a control process for selecting a vehicle maneuver according to the present disclosure.

At 312, the OBD module 102 receives a selected vehicle maneuver from the user device module 126 as explained herein. For example, FIG. 4 illustrates one example process for receiving a selected vehicle maneuver and further explained below. The selected vehicle maneuver may include one of a U-turn maneuver, a right turn maneuver, a left turn maneuver, etc. Control then proceeds to 314.

At 314, the OBD module 102 receives criteria (e.g., parameters) specific to the selected vehicle maneuver. For example, and as explained herein, the OBD module 102 may receive an expected torque value specific to the selected vehicle maneuver, a defined sign convention of the expected torque value, and a defined velocity and steering angle associated with the expected torque value. As one example, if the selected vehicle maneuver is a U-turn, the OBD module 102 may receive an expected torque value of +/−200 Nm, a defined velocity of 15 kilometers per hour, and a defined steering angle of +/−115 degrees. Additionally, if the selected vehicle maneuver is a right turn maneuver, the OBD module 102 may receive an expected torque value of −200 Nm, a defined velocity of 15 kilometers per hour, and a defined steering angle of 90 degrees. Further, if the selected vehicle maneuver is a left turn maneuver, the OBD module 102 may receive an expected torque value of 200 Nm, a defined velocity of 15 kilometers per hour, and a defined steering angle of −90 degrees. Control then proceeds to 316.

At 316, the OBD module 102 may receive an input from the user device module 126 to start testing. For example, once the vehicle maneuver is selected, the user may select an input on (e.g., displayed on) the user device module 126 to start testing. If the input to start testing is not received, control returns to 316. In various embodiments, control may wait a period of time for an input to start testing. If no input is received before the period of time expires, control may return to 302 or another step in the control process 300. If the input to start testing is received at 316, control proceeds to 318. In other embodiments, control may proceed to 318 without receiving an input from the user device module 126 to start testing. At this point, the user may drive the selected vehicle maneuver.

At 318, the OBD module 102 receives actual parameters of the vehicle as the vehicle is controlled by the user to execute the selected vehicle maneuver. For example, the OBD module 102 may receive the actual output torque of the stabilizer bars (e.g., the stabilizer bars 106 of FIG. 1), and the actual velocity and steering angle of the vehicle when the vehicle executes the selected vehicle maneuver. In various embodiments, the OBD module 102 and/or a user device such as the user device module 126 of FIG. 1 may receive and record the parameters over a defined period of time (e.g., 30 seconds, etc.) set by, for example, the OBD module 102 and/or the user device module 126. Such parameters may be received individually from the control module 108 (or the ARC modules 104), the velocity sensor 122, and the steering control module 116, or collectively from the control module 108. Control then proceeds to 320.

Figure 5:
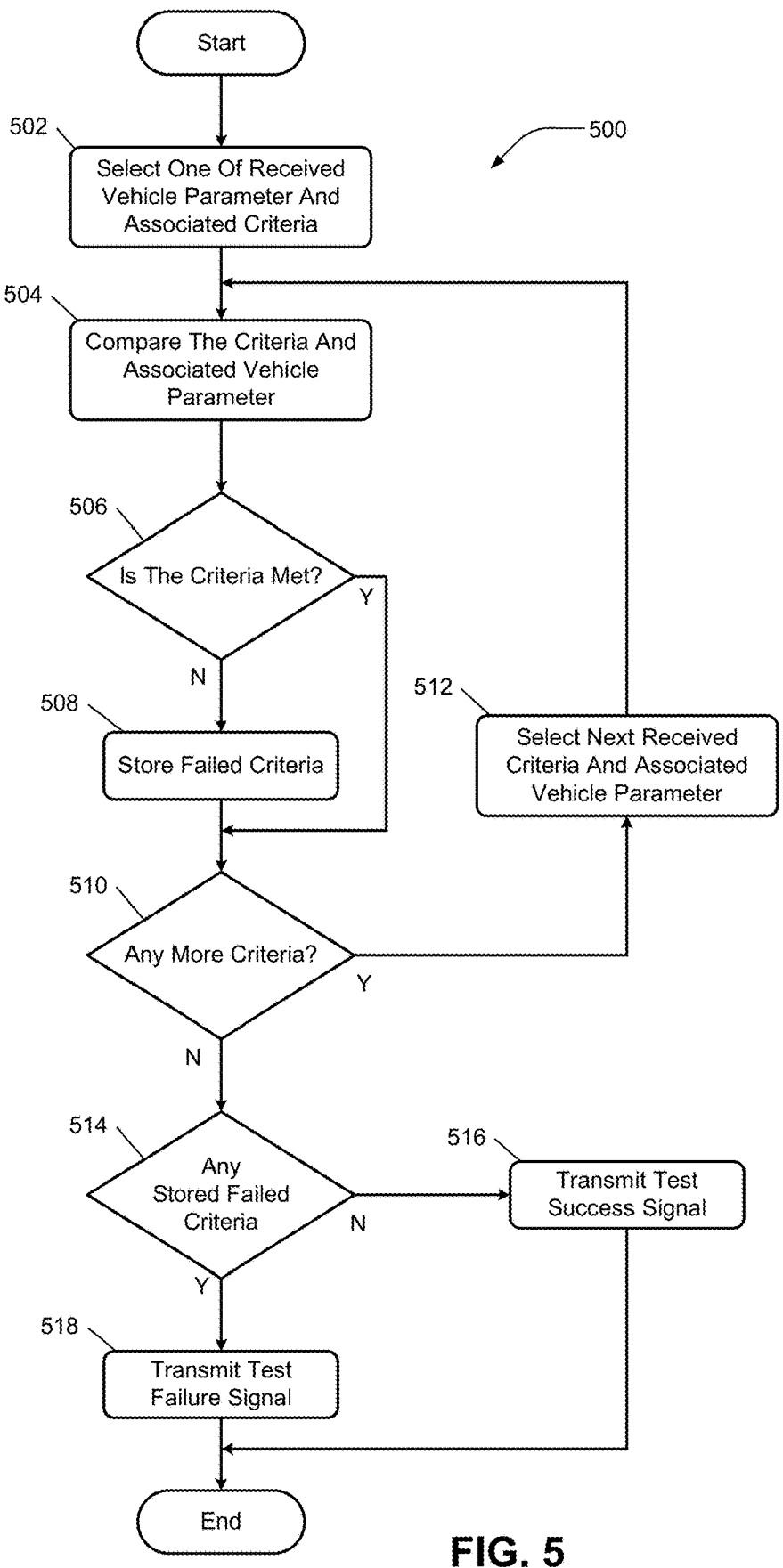
FIG. 5 is a flowchart of a control process for determining whether vehicle parameters fall below criteria specific to a selected vehicle maneuver according to the present disclosure.

At 320, the OBD module 102 and/or the user device module 126 determines whether each received actual parameter (at any point during the testing) meets its associated criteria specific to the selected vehicle maneuver. For example, the OBD module 102 or the user device module 126 may make this determination based on, for example, a direct comparison of each actual parameter and its associated criteria, a difference between each actual parameter and its associated criteria, etc. as explained herein. For example, FIG. 5 illustrates one example process (further explained below) for determining whether each received actual parameter meets its associated criteria specific to the selected vehicle maneuver.

As one example, if the selected vehicle maneuver is a U-turn, the OBD module 102 (or the user device module 126) may determine whether the actual output torque of both stabilizer bars is less than −200 Nm or greater than 200 Nm, the actual velocity is greater than 15 kilometers per hour, and the actual steering angle is greater than 115 degrees or less than −115 degrees. Additionally, if the selected vehicle maneuver is a right turn maneuver, the OBD module 102 (or the user device module 126) may determine whether the actual output torque of both stabilizer bars is less than −200 Nm, the actual velocity is greater than 15 kilometers per hour, and the actual steering angle is greater than 90 degrees. Further, if the selected vehicle maneuver is a left turn maneuver, the OBD module 102 (or the user device module 126) may determine whether the actual output torque of both stabilizer bars is greater than 200 Nm, the actual velocity is greater than 15 kilometers per hour, and the actual steering angle is less than −90 degrees.

If at least one the received actual parameters does not meet (e.g., falls below) its associated criteria specific at 320 (as determined by the OBD module 102 or the user device module 126), control proceeds to 322. Otherwise, control proceeds to 324.

At 322, the OBD module 102 and/or the user device module 126 may identify the specific criteria that is not met. For example, the OBD module 102 or the user device module 126 may identify which ones of procedure criteria (e.g., the actual velocity and/or the actual steering angle) and/or performance criteria (e.g., the actual torque) of the moving vehicle that do not meet the defined criteria values (e.g., the defined velocity, the defined steering angle, and/or the expected torque).

Control then proceeds to 310 where the OBD module 102 transmits a signal to the user device module 126 indicating a failure of the test due with an explanation of such failure as explained herein. In other embodiments, the user device module 126 may generate a signal indicating a failure of the test. In various embodiments, the user device module 126 may then display a message indicating a failure of the test with the explanation of such failure. For example, the displayed message may be (a) "Test fail due to incorrect sequence. Vehicle speed must be greater 15 kph (10 mph) and steering angle must be greater 90 deg."; (b) "Test fail due to incorrect sequence. Vehicle speed must be greater 15 kph (10 mph) and steering angle must be greater 115 deg."; (c) "Test fail due to incorrect torque from ARC_F."; (d) "Test fail due to incorrect torque from ARC_R."; and/or (e) "Test fail due to incorrect sign convention of torque output." In response, the technician may review data, rerun the test, inspect hardware (e.g., the ARC modules 104, the front and/or rear stabilizer bars 106, etc.), etc. Control then ends.

At 324, the OBD module 102 transmits a test success signal to the user device module 126 indicating the test was passed. In other embodiments, the user device module 126 may generate a signal indicating the test was passed. In various embodiments, the user device module 126 may then display a message indicating a successful test. Control then ends.

FIG. 4 illustrates an example control process 400 employable by the vehicle system of FIG. 1 for receiving a selected vehicle maneuver. Although the example control process 400 is described in relation to the vehicle system of FIG. 1, including the OBD module 102 and the user device module 126, the control process 400 may be employable by any suitable vehicle system, OBD module, and/or user device. The control process 400 may start when the vehicle system is powered-on and/or at another suitable time. For example, the control process 400 may start after a user selects an input (e.g., on the user device module 126, etc.) to initiate testing.

As shown in FIG. 4, control begins at 402 where the user device module 126 displays multiple vehicle maneuvers for selection by a user. The vehicle maneuvers may include, for example, a U-turn maneuver, a right turn maneuver, a left turn maneuver, etc. as explained herein. In such examples, the user device module 126 may receive the vehicle maneuvers from the OBD module 102, retrieve the vehicle maneuvers stored in a memory circuit therein, etc. Control then proceeds to 404.

At 404, the user device module 126 determines whether one of the vehicle maneuvers has been selected. If not, control returns to 404 or may return to 402. If so at 404, control proceeds to 406 where the user device module 126 transmits (e.g., provides) the selected maneuver to the OBD module 102. In other embodiments, the user device module 126 may contain the selected maneuver if, for example, the user device module 126 is used to determine whether each received actual parameter meets its associated criteria specific to the selected vehicle maneuver, as explained above relative to FIG. 3. Control then ends.

FIG. 5 illustrates an example control process 500 employable by the vehicle system of FIG. 1 for determining whether a received actual parameter falls below its associated criteria specific to a selected vehicle maneuver. Although the example control process 500 is described in relation to the vehicle system of FIG. 1, including the OBD module 102 and the user device module 126, the control process 500 may be employable by any suitable vehicle system, OBD module, and/or user device. The control process 500 may start when the vehicle system is powered-on and/or at another suitable time. For example, the control process 500 may start after actual parameters and their associated criteria are received.

As shown in FIG. 5, control begins at 502 where the OBD module 102 and/or the user device module 126 selects one of the received actual vehicle parameters and its associated criteria specific to a selected vehicle maneuver. For example, the OBD module 102 (or the user device module 126) may select the actual velocity of the vehicle and the defined velocity. Control then proceeds to 504 where the OBD module 102 or the user device module 126 compares the selected vehicle parameter and associated criteria. For example, the OBD module 102 may compare the actual vehicle velocity and the defined velocity. Control then proceeds to 506.

At 506, the OBD module 102 and/or the user device module 126 determines whether the criteria is met. For example, the OBD module 102 or the user device module 126 may determine whether the actual vehicle velocity of the moving vehicle meets or falls below the defined velocity. If the criteria is not met, control proceeds to 508 where the criteria is stored in, for example, the memory circuit 124 of FIG. 1 and/or another suitable location. Control then proceeds to 510. If the criteria is met, control proceeds to 510.

At 510, the OBD module 102 and/or the user device module 126 determines whether any more criteria is available for selection. If so, control proceeds to 512 where the OBD module 102 or the user device module 126 selects another (e.g., the next) one of the received actual vehicle parameters and its associated criteria specific to the selected vehicle maneuver. For example, the OBD module 102 or the user device module 126 may select the actual output torque (or the actual steering angle) and the expected torque (or the defined steering angle). Control then returns to 504 where the OBD module 102 or the user device module 126 compares the newly selected vehicle parameter and associated criteria. If not at 510, control proceeds to 514.

At 514, the OBD module 102 and/or the user device module 126 determines whether any failed criteria are stored in the memory circuit 124 of FIG. 1 and/or another suitable location. For example, the OBD module 102 or the user device module 126 may read the memory circuit 124 to determine whether the memory circuit 124 includes any failed criteria. If no, control proceeds to 516 where the OBD module 102 transmits a test success signal to the user device module 126 indicating the test was passed (as explained above). Control then ends. If yes at 514, control proceeds to 518 where the OBD module 102 transmits a signal to the user device module 126 indicating a failure of the test with, in some examples, an explanation of such failure as explained herein. In other embodiments, the user device module 126 may generate a test success signal and/or a signal indicating a failure of the test as explained herein. Control then ends.

The present application states one or more problems that are unique to a particular technical field of ARC system testing in vehicles. The present application describes that the claimed embodiments resolve these unique issues. For example, some claims involve receiving a selected maneuver for a vehicle; receiving an expected torque of an ARC system in the vehicle for the selected maneuver according to a defined velocity and a defined steering angle of the vehicle; receiving, while the vehicle is controlled to execute the selected maneuver, an actual torque of the ARC system, an actual velocity of the vehicle, and an actual steering angle of the vehicle; determining whether any one of the actual torque, the actual velocity, and the actual steering angle falls below the expected torque, the defined velocity, and the defined steering angle, respectively; and in response to determining any one of the actual torque, the actual velocity, and the actual steering angle falls below the expected torque, the defined velocity, and the defined steering angle, generating a signal indicating a failure of the test. Accordingly, the claimed embodiments effectuate an improvement in the technical field of ARC system testing in vehicles.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An on-board diagnostics (OBD) system for conducting a test of at least one active roll control (ARC) system in a vehicle while the vehicle is moving, the OBD system comprising:
    a plurality of sensors in the vehicle, the plurality of sensors including a torque sensor configured to detect an actual torque of a stabilizer bar of the ARC system in the vehicle, a velocity sensor configured to detect an actual velocity of the vehicle, and a steering wheel angle sensor configured to detect an actual steering angle of the vehicle;
    a controller configured to receive a selected maneuver of a plurality of maneuvers for the vehicle, and receive an expected torque associated with the ARC system for the selected maneuver according to a defined velocity and a defined steering angle of the vehicle, wherein the controller includes an OBD controller or a user device controller; and
    at least one vehicle controller in communication with the ARC system of the vehicle and the controller, the vehicle controller configured to control one or more actuators of the vehicle to cause the vehicle to execute the selected maneuver, and receive, while the vehicle is controlled to execute the selected maneuver, the actual torque of the ARC system from the torque sensor, the actual velocity of the vehicle from the velocity sensor, and the actual steering angle of the vehicle from the steering wheel angle sensor,
    wherein the controller is configured to:
        determine whether any one of the actual torque, the actual velocity, and the actual steering angle falls below the expected torque, the defined velocity, and the defined steering angle, respectively; and
        in response to determining any one of the actual torque, the actual velocity, and the actual steering angle falls below the expected torque, the defined velocity, and the defined steering angle, generate a signal indicating a failure of the test.

2. The OBD system of claim 1, wherein the controller is configured to generate a signal indicating a success of the test in response to determining each of the actual torque, the actual velocity, and the actual steering angle is greater than or equal to the expected torque, the defined velocity, and the defined steering angle, respectively.

3. The OBD system of claim 1, wherein the controller is configured to:
    receive a defined sign convention of the expected torque for the selected maneuver;
    determine whether a sign convention of the actual torque matches the defined sign convention; and
    in response to determining that the sign convention of the actual torque does not match the defined sign convention, generate the signal indicating the failure of the test.

4. The OBD system of claim 1, wherein the controller is configured to:
    identify whether a diagnostics trouble code associated with the ARC system exists prior to receiving the selected maneuver; and
    in response to identifying the diagnostics trouble code, generate the signal indicating the failure of the test.

5. The OBD system of claim 1, wherein the controller is configured to:
    identify each of the actual torque, the actual velocity, and the actual steering angle that falls below the expected torque, the defined velocity, and the defined steering angle, respectively; and
    generate the signal indicating the failure of the test and an explanation of the failure specific to each of the actual torque, the actual velocity, and the actual steering angle falling below the expected torque, the defined velocity, and the defined steering angle.

6. The OBD system of claim 5, wherein the controller is configured to display a message indicating the failure of the test and the explanation.

7. The OBD system of claim 1, wherein the controller is configured to display a message indicating the failure of the test.

8. The OBD system of claim 1, wherein the plurality of maneuvers for the vehicle includes a U-turn maneuver, a left turn maneuver, and a right turn maneuver.

9. The OBD system of claim 1, wherein the controller is configured to display the plurality of maneuvers.

10. The OBD system of claim 1, further comprising a memory circuit in communication with the controller, wherein:
    the memory circuit is configured to store the expected torque, the defined velocity, and the defined steering angle; and
    the controller is configured to receive the expected torque, the defined velocity, and the defined steering angle from the memory circuit.

11. A vehicle comprising the OBD system of claim 1 and at least one ARC system in communication with the OBD system.

12. An on-board diagnostics (OBD) method for testing at least one active roll control (ARC) system in a vehicle while the vehicle is moving, the OBD method comprising:
    receiving, for a test of the ARC system, a selected maneuver of a plurality of maneuvers for the vehicle;
    controlling one or more actuators of the vehicle to cause the vehicle to execute the selected maneuver;

receiving an expected torque of the ARC system for the selected maneuver according to a defined velocity and a defined steering angle of the vehicle;

receiving, while the vehicle is controlled to execute the selected maneuver, an actual torque of a stabilizer bar of the ARC system from a torque sensor in the vehicle, an actual velocity of the vehicle from a velocity sensor in the vehicle, and an actual steering angle of the vehicle from a steering wheel angle sensor in the vehicle;

determining whether any one of the actual torque, the actual velocity, and the actual steering angle falls below the expected torque, the defined velocity, and the defined steering angle, respectively; and in response to determining any one of the actual torque, the actual velocity, and the actual steering angle falls below the expected torque, the defined velocity, and the defined steering angle, generating a signal indicating a failure of the test.

13. The OBD method of claim 12, furthering comprising generating a signal indicating a success of the test in response to determining each of the actual torque, the actual velocity, and the actual steering angle is greater than or equal to the expected torque, the defined velocity, and the defined steering angle, respectively.

14. The OBD method of claim 12, furthering comprising:

receiving a defined sign convention of the expected torque for the selected maneuver;

determining whether a sign convention of the actual torque matches the defined sign convention; and in response to determining that the sign convention of the actual torque does not match the defined sign convention, generating the signal indicating the failure of the test.

15. The OBD method of claim 12, further comprising:

identifying whether a diagnostics trouble code associated with the ARC system exists prior to receiving the selected maneuver; and in response to identifying the diagnostics trouble code, generating the signal indicating the failure of the test.

16. The OBD method of claim 12, further comprising:

identifying each of the actual torque, the actual velocity, and the actual steering angle that falls below the expected torque, the defined velocity, and the defined steering angle, respectively; and wherein generating the signal includes generating the signal indicating the failure of the test and an explanation of the failure specific to each of the actual torque, the actual velocity, and the actual steering angle falling below the expected torque, the defined velocity, and the defined steering angle.

17. The OBD method of claim 16, further comprising displaying a message indicating the failure and the explanation.

18. The OBD method of claim 12, further comprising displaying a message indicating the failure.

19. The OBD method of claim 12, wherein the plurality of maneuvers for the vehicle includes a U-turn maneuver, a left turn maneuver, and a right turn maneuver.

20. The OBD method of claim 12, wherein the expected torque, the defined velocity, and the defined steering angle are stored in a memory circuit.

\* \* \* \* \*